3,532,938
ELECTRICAL PANELBOARD WITH ADJUSTABLE
COVER MOUNTING MEANS
Merle R. Holman, Rexdale, Ontario, and Charles F. Latter, Brampton, Ontario, Canada, assignors, by mesne assignments, to Square D Company, Park Ridge, Ill., a corporation of Michigan
Filed Mar. 4, 1968, Ser. No. 710,229
Int. Cl. H02b 13/06
U.S. Cl. 317—119    2 Claims

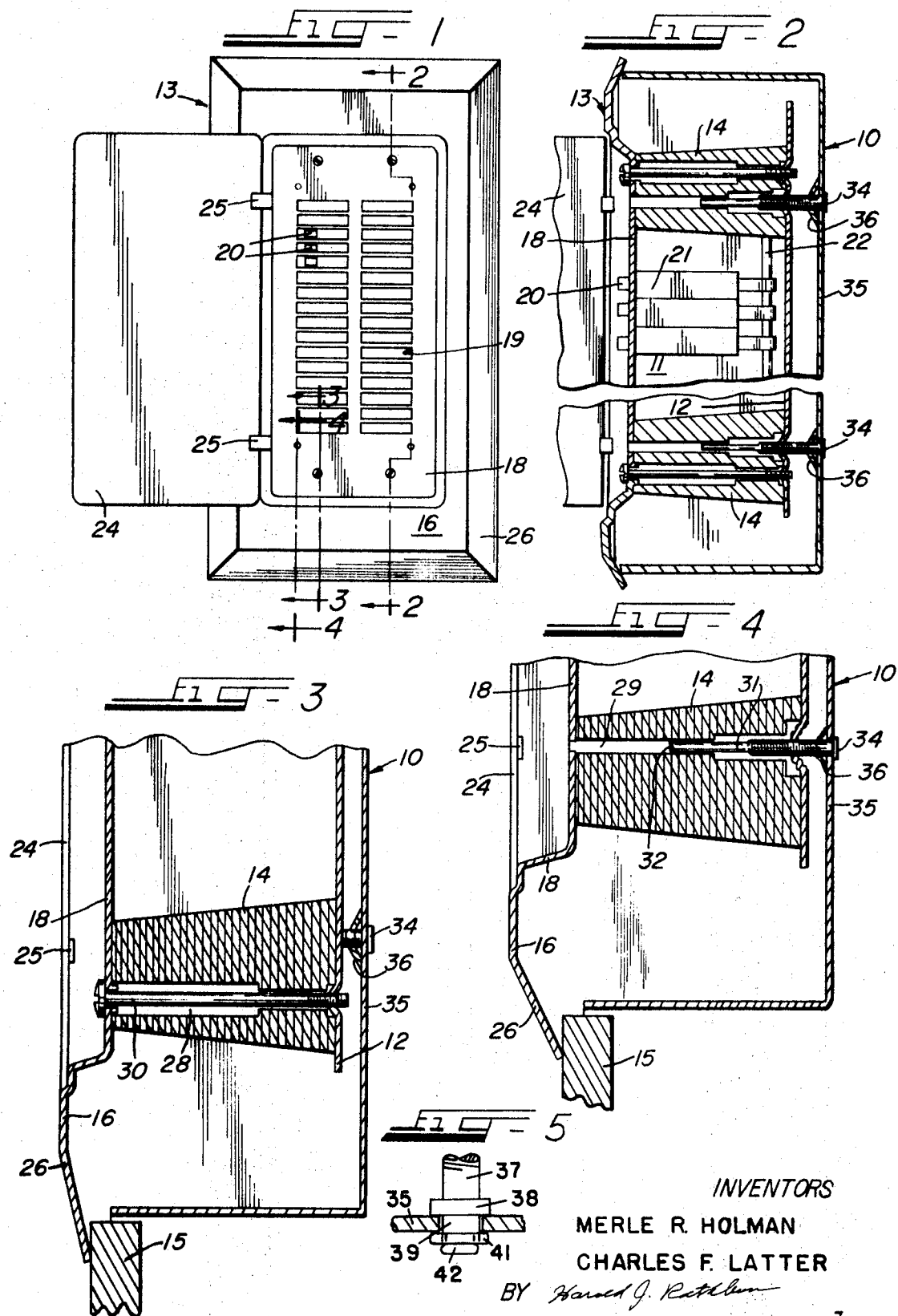

ABSTRACT OF THE DISCLOSURE

A plurality of insulating spacers maintain a mounting pan and a front cover of a panelboard in fixed spaced relation. Threaded studs rotatably carried by a back wall of an enclosing box of the panelboard are threaded into the mounting pan and extend into openings in the respective spacers so as to be accessible for rotation from the front of the panelboard.

---

This invention relates to electrical panelboards or load centers, and more particularly to a means for adjustably securing a mounting pan and cover assembly to an enclosing box of the panelboard or load center.

The enclosing box of a panelboard or load center is often installed in a recess provided in a wall with marginal areas of the cover of the panelboard overlying the outer surface of the wall about the opening. After finishing of the wall with plaster or plaster board, the front edges of the side walls of the enclosing box disposed in the wall recess may be spaced at random distances from the outer wall surface and not necessarily parallel therewith. When the cover is mounted on the enclosing box, the marginal areas of the cover should snugly engage the outer wall surface about the opening. In order to compensate for misalignment of the box and to permit the cover to engage the outer wall properly, it is desirable to provide means for adjustably securing the cover to the box. To insure that operating handles of circuit breakers carried by the mounting pan are properly positioned with respect to the cover, it is also necessary to provide for adjustment of the position of the mounting pan with respect to the box.

In some prior constructions, the position of both the mounting pan and cover is made adjustable with respect to the box and with each other. This, of course, requires the use of two sets of adjustment means. In other prior constructions, the cover and mounting pan are secured to each other in fixed relation to form an assembly with one set of adjustment means being provided at the rear of the box to mount the assembly adjustably with respect to the box. Because it is desirable to secure the assembly to the back of the box, problems of how to reach an adjustment means at the rear of the box when the cover is in position have not been successfully solved.

In accordance with this invention, a simple and inexpensive means is provided to adjustably secure a mounting pan and cover assembly of a panelboard to the back of an enclosing box of the panelboard and which means is accessible from the front of the box with the cover in place.

An object of this invention is to provide an improved panelboard structure that is relatively easy to install within a recess in a wall with the cover snugly fitted against the wall surface.

Another object is to provide an electrical panelboard with improved means for adjustably securing a mounting pan and cover assembly to an enclosing box of the panelboard.

A panelboard in accordance with this invention comprises an enclosing box, a mounting pan, a cover, and interconnecting means maintaining the mounting pan and the cover in fixed spaced-apart relation. The interconnecting means comprises a plurality of spacers each having two longitudinal openings aligned with openings in the pan and cover. A screw is received in one of the two longitudinal openings in each spacer and is threaded into the opening in the pan aligned therewith, and a stud is received in the other of the two openings in each spacer, is accessible from the front of the cover, is threaded into the opening in the pan aligned therewith, and has a portion extending rearwardly of the pan and rotatably carried by a back wall of the box.

Other objects and advantages of the invention will become apparent from the following description wherein reference is made to the drawing, in which:

FIG. 1 is a front view of a panelboard in accordance with the invention;

FIGS. 2, 3, and 4 are sectional views taken as indicated by the lines 2—2, 3—3, and 4—4, respectively, of FIG. 1; and FIG. 5 is a sectional view showing an alternative embodiment of threaded studs used in the invention.

An electrical panelboard in accordance with this invention, as shown in the drawing, comprises a rectangular enclosing box 10 and a mounting pan and cover assembly 11 including a mounting pan 12, a front member or cover 13, and four spacers 14 forming interconnecting means and positioned between the pan and cover at the four corners of the assembly, respectively. The box 10 is shown positioned within a recess in a wall 15, the relative position of the front edges of the side walls of the box and the outer surface of the wall being variable because of misalignment of the box or variations in the wall thickness, or both.

The cover 13 includes a front trim panel 16 having a central depressed portion 18 provided with openings 19 for receiving respective operating handles 20 of circuit controlling devices 21 plugged into, or otherwise secured to, a bus structure 22 carried by the pan 12. A door 24 forming part of the cover 13 is carried by the trim panel 16 by hinges 25, and, when closed, encloses the depressed portion 18.

The marginal areas of the trim panel 16 are beveled as at 26 and overlie the outer surface of the wall 15 about the recess. Because of the variable positional relation between the outer surface of the wall 15 and the box 10 mentioned above, it is desirable that the means for mounting the pan and cover assembly 11 on the box 10 be adjustable to permit the outer edge areas of the front panel 16 to abut the outer surface of the wall 15 with a slight pressure irrespective of the amount of positional variation between the box 10 and the outer surface of the wall 15. The adjustable mounting means now to be described provides this adjustment.

The mounting pan 12 is spaced a fixed distance from the recessed portion 18 of the trim panel 16 by means of the four identical spacers 14. Each spacer 14 is preferably made from a phenolic material in the form of a truncated cone and has two longitudinal or axially-directed openings 28 and 29 extending therethrough. The openings 28 are of two different diameters with the larger diameter portion nearer the front and are aligned with respective openings in the depressed portion 18 to receive respective screws 30 having their rear end portions threaded into respective aligned openings in the pan 12. The threaded connection between each of the screws 30 and the pan 12 is effected by forwardly deforming the marginal area around the respective screw-receiving openings in the pan. When the screws 30 are tightened, the pan 12 and the cover 13 are in fixed spaced relation to each other.

Extending forwardly from the rear of the box 10 are four threaded studs 31 spaced to enter the respective openings 29 when the mounting pan and cover assembly 11 is correctly positioned with respect to the box 10. The openings 29 are of three different diameters with the smallest diameter portion at the front and the largest diameter portion at the rear of the respective spacers 14. The openings 29 are aligned with respective openings in the pan 12. The studs 31 have screwdriver slots 32 at their front or forward end faces within the smallest portions of the openings 29. As shown, each of the studs 31 is rotatably carried by a back wall 35 by means of a head 34 on its rear end which engages the rear surface of the back wall 35. Intermediate portions of the studs 31 are threaded and are in threaded connection with the respective stud-receiving openings in the pan 12, which connection is effected by forwardly deforming the marginal area around the openings. The studs 31 are retained against rearward axial movement with respect to the back wall 35 by respective push-on type retaining rings 36, and rotate freely with respect to the box 10. Thus, turning of the studs 31 by means of the screwdriver slots 32 moves the mounting pan and cover assembly forwardly or rearwardly with respect to the box 10.

An alternative embodiment of the threaded studs used in this invention includes four threaded studs 37, one of which is shown in FIG. 5, which like the studs 31 extend forwardly from the rear of the box 10 and are spaced to enter the respective openings 29. The studs 37 have screwdriver slots (not shown) at their forward end faces.

Referring now to FIG. 5, each of the studs 37 is rotatably carried by the back wall 35 of the box 10 by means of an enlarged diameter portion 38 near its rearmost end and an adjoining rear end portion 39 part of which is peened over as later described. Intermediate portions of the studs 37 are threaded and are in threaded connection with the respective stud-receiving openings in the pan 12 in the same manner as shown for the studs 31. The studs 31 and 37 may be provided with left-hand threads, as shown in FIG. 5, for convenience of adjustment so as to obtain a rearward movement of the mounting pan and cover assembly 11 with respect to the box 10 when the studs are rotated clockwise as viewed from the front. Each of the studs 37 is retained against rearward axial movement with respect to the back wall 35 by its enlarged portion 38, and rotate freely with respect to the box 10. As shown in FIG. 5, each enlarged portion 38 abuts the inner surface of the back wall 35, the rear end portion 39 extends through the back wall 35 thereby to expose a short length at the rear of the box 10. Each stud 37 is then captured by the back wall 35 by inserting a washer 41 on the exposed part of the portion 39 and peening the exposed part over to form a head 42.

We claim:

1. An electrical panelboard comprising an open front rectangular box having a back wall and four side walls, a mounting pan disposed in the box generally parallel to the back wall, a cover closing the front of the box, the cover including marginal portions overlying the front edge faces of the side walls and a central portion depressed toward the back wall, means laterally within the depressed central portion removably securing the cover to the mounting pan independently of the box and in predetermined spaced-apart relationship, and adjustable mounting means adjustably securing the mounting pan to the back wall of the box, the adjustable mounting means including a plurality of threaded studs each rotatably secured to the back wall of the box in fixed relationship axially thereto and extending into threaded engagement with the mounting pan, and the depressed central portion of the cover having a plurality of openings therethrough in alignment respectively with the threaded studs, whereby the threaded studs are accessible through the depressed central portion of the cover and are adjustable in opposite directions to positively move the mounting pan and the cover secured thereto respectively toward and away from the back wall of the box.

2. An electrical panelboard as claimed in claim 1 including a plurality of spacers determining the spaced-apart relationship of the cover and mounting pan, each of the spacers having a pair of openings extending longitudinally therethrough, and wherein the means removably securing the cover to the mounting pan comprises a plurality of screws each extending through the depressed central portion of the cover, through one of the openings in one of the spacers, and through the mounting pan, and each of the threaded studs extends into the other of the openings in one of the spacers.

References Cited

UNITED STATES PATENTS

| 2,138,408 | 11/1938 | Rowe | 317—119 |
| 3,192,447 | 6/1965 | Kenyeres et al. | 317—119 |
| 3,312,873 | 4/1967 | Stanback et al. | 317—119 |
| 3,382,416 | 5/1968 | Jacobs et al. | 317—119 |

LARAMIE E. ASKIN, Primary Examiner

D. A. TONE, Assistant Examiner